United States Patent [19]

Gulmini

[11] Patent Number: 5,042,634
[45] Date of Patent: Aug. 27, 1991

[54] COLLECTION AND RECYCLING UNIT FOR USED CONTAINERS

[75] Inventor: Carlo Gulmini, Casumaro, Italy
[73] Assignee: Govoni SPA, Casumaro, Italy
[21] Appl. No.: 473,728
[22] Filed: Feb. 2, 1990
[51] Int. Cl.$^5$ ............................................... G07F 7/06
[52] U.S. Cl. .................................. 194/209; 100/902; 241/236
[58] Field of Search ............... 194/205, 208, 209, 210, 194/212, 213; 100/902; 241/235, 236; 209/930

[56] References Cited

U.S. PATENT DOCUMENTS

| | | | |
|---|---|---|---|
| Re. 27,643 | 5/1973 | Myers | 194/208 |
| 1,044,833 | 11/1912 | Wall | 241/236 |
| 1,188,464 | 6/1916 | Mace | 241/236 |
| 3,750,966 | 8/1973 | Anderson | 241/235 X |
| 4,207,973 | 6/1980 | Stampleman | 194/212 |
| 4,784,251 | 11/1988 | DeWoolfson et al. | 194/209 |
| 4,829,428 | 5/1989 | Weitzman et al. | 209/930 X |

*Primary Examiner*—F. J. Bartuska
*Attorney, Agent, or Firm*—McAulay Fisher Nissen Goldberg & Kiel

[57] ABSTRACT

A system for collecting and recycling used containers made from metal and plastic materials, having two different operative cycles for processing the containers in a closed cubicle compartment provided with two openings for introducing containers while pre-separating the plastic from the metal containers; lower doors provide access to the cubicle for removal of processed containers, a gate including a central opening for receiving the neck and only allowing passage of the plastic container sensed by a neck sensor and for operating an electrically operated piston-cylinder assembly to operate the gate and permit the entire plastic bottle to be conveyed to a first roller set for squeezing thereof including intermediate rollers positioned between two squeezing rollers, the intermediate rollers having different diameters for reducing the size of the container, and the metal container is also conveyed to a second set of squeezing rollers and both types of containers pass a sensor for counting the number thereof, the second set of rollers includes coaxial rollers which turn simultaneously with the first set of squeezing rollers, and a sensor capable of recognizing the material type for authorizing payment.

20 Claims, 5 Drawing Sheets

COLLECTION AND RECYCLING UNIT FOR USED CONTAINERS

BACKGROUND OF THE INVENTION

1. Field of the Invention

This invention relates to a collection and recycling unit for used containers. More particularly, the invention is concerned with the collection and recycling of containers made of glass, plastic and different types of metals.

2. Description of the Prior Art

Heretofore, machines for recycling used containers mainly operated automatically to collect and recycle either in a single or a combined operation, as well as using different operational compartments, for used glass and plastic bottles and metal containers, metal cans and similar items. The devices heretofore permitted a centralization and unification of various differentiated collecting points of waste materials which can be recovered, such as, for instance, those waste materials connected with the distribution of liquid foodstuffs, where the ability exists of recovering the used plastic and metal containers.

In many instances, at present, these containers are thrown away together with solid urban waste, thus scattering and destroying a possible or potential source of energy connected with the material from which the containers are made and to provide a theoretical economic residuary value. To all of the aforesaid, it is necessary to add and to include the heavy problems and deleterious effect in connection with the surrounding area that are at present caused by the elimination of these containers, both from a sight point of view as well as from the point of view of cleanliness.

SUMMARY OF THE INVENTION

It is therefore a primary purpose of the present invention to overcome the aforesaid problems by providing an apparatus and system for carrying out the collection and recycling of used containers, whether plastic or metal.

More particularly, the invention is applicable to the collecting and recycling of used containers, both in plastic and metal materials, at the same distribution points, by adopting a unit which, while performing a compacting action of the materials in a mechanical way, does not turn out or cause pollution of the surrounding areas.

A further feature of the invention is the provision of incentives for the recovery of used containers. For this purpose, the unit can be supplied either with funds or filled containers, from one or more distributors and/or containers filled at the origin, to distribute to a consignee of a previously ordered number of returned empty containers.

Another feature of the invention is that the unit can deliver a pull ticket or receipt recording the number of delivered, containers to receive a cash reimbursement or, alternatively, the units can be programmed to deliver a number and type of filled containers that have to be delivered to equal the value of the returned containers. The system can also be used with a magnetic card onto which is recorded the type of the items delivered or returned and whether bottles or containers and whether plastic or metal.

Other objects of the invention will become apparent after consideration of the detailed description considered in connection with the accompanying drawings.

DESCRIPTION OF THE PREFERRED EMBODIMENTS

Figure 1:
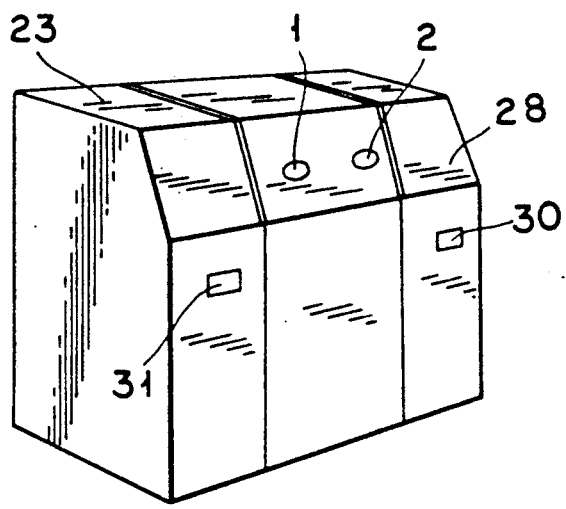
FIG. 1 is a perspective view of a unit according to the invention, containing the mechanisms for two different container operational cycles.

Referring now more particularly to FIG. 1 of the drawings, which show the best mode for carrying out the invention, and the unit includes a closed cubicle compartment C with two upper inlets 1 and 2 for a manual input. Inlet 1 is for plastic containers and inlet 2 is for metal containers and with lower doors 1a, 2a, for respectively withdrawing of the recycled plastic and metal materials.

The operative cycle for plastic containers begins with their being input into cubicle C through opening 1.

Figure 2:
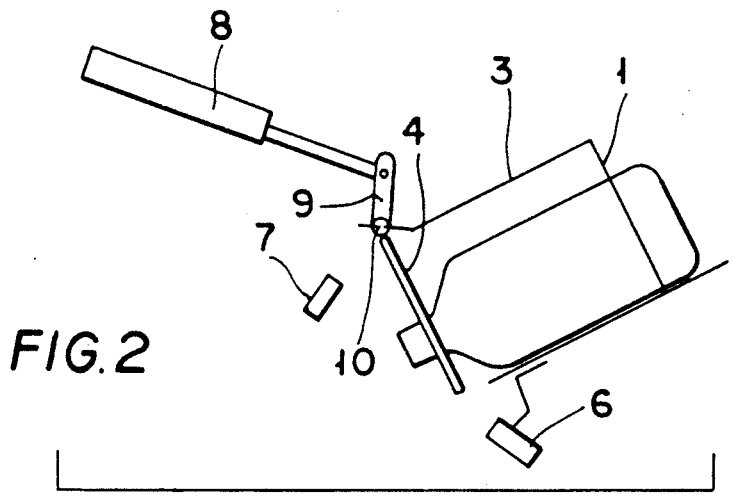
FIG. 2 is a partially schematic view of a part of the unit for one operational cycle showing one portion of the unit for use in connection with the processing of plastic containers, and the portion pertaining to the processing of non-plastic containers being omitted for the sake of simplicity.
Figure 3:
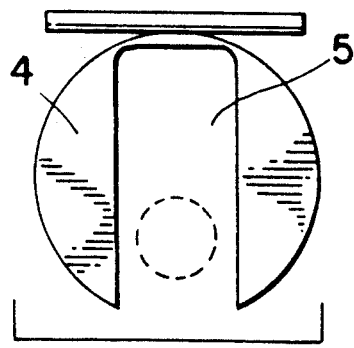
FIG. 3 is an elevational view of a portion of FIG. 2 primarily showing a container neck receiving portion, such as the neck for a plastic bottle or container.
Figure 4:
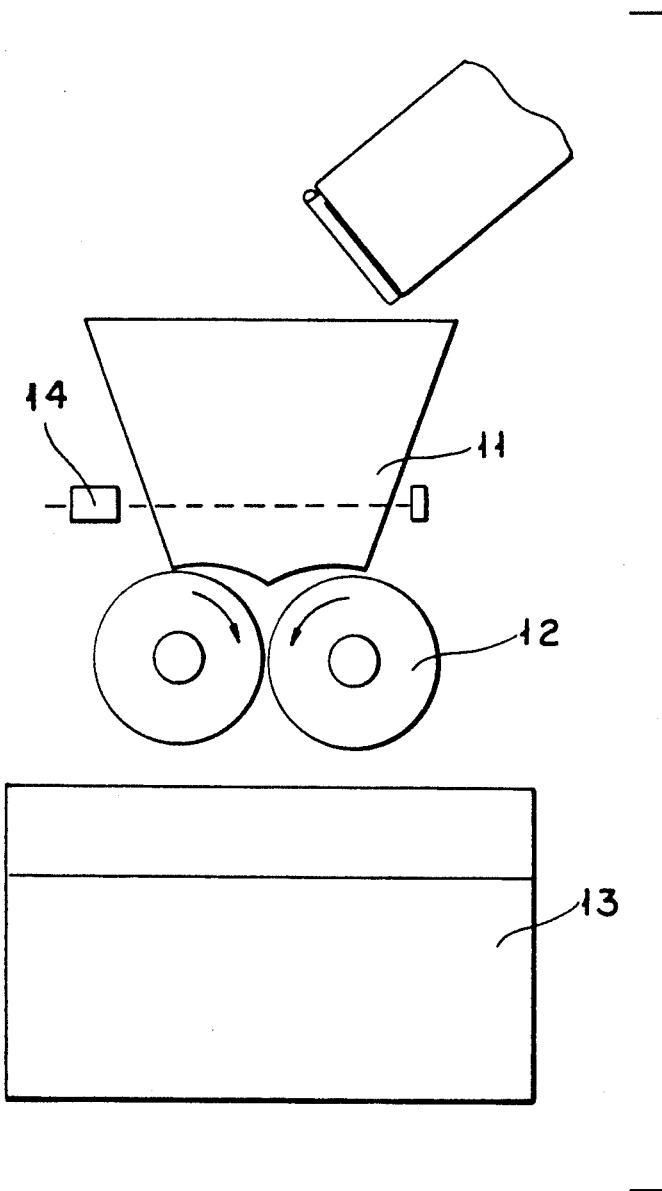
FIG. 4 is another portion of the plastic container processing and illustrating, in particular, a portion of the feed of the unit shown in FIG. 2, a funnel for receiving the containers, a roller mechanism for processing the plastic containers and a collector for receiving the processed containers.

Referring now more particularly to FIGS. 2 to 4 which shows the portion of cubicle compartment C directed to the processing of plastic containers.

For the sake of explanation, this portion is intended for the processing of bottles having a neck portion formed from plastic. In particular, the plastic containers which are to the processed or recycled are placed into inlet 1 with its narrower or neck portion first, and, for this purpose, there is provided a pipe 3 with a gate 4 having a central opening 5 for reception of the neck N of the container or bottle B. A sensing system comprising a photocell receiver-transmitter 6 for transmitting luminous flux or radiant energy which is received by a reflector 7 which in turn reflects the luminous flux or radiant energy back to the photocell receiver-transmitter 6. Photocell 6 can also be an individual transmitter without receiving capabilities and reflector 7 which is schematically shown can be a receiver without reflecting capabilities and, when no beam is received by reflector 7 either as a receiver or for the transmission back to photocell 6, then the bottle B enters the processing system.

The unit C accepts plastic containers only if they are introduced by the neck. The descending plastic container in pipe 3 is stopped by gate 4 which is provided with central opening 5 and only permits passage of the container neck. In this position, the neck interrupts the luminous flux of photocell 6 towards the reflector 7, thus permitting gate 4 to be opened or moved out of the way from the remainder of the body of the bottle. Gate 4 is opened by means of an electrically activated piston of the piston-cylinder assembly 8 (FIG. 2) which, through the piston portion coupled with lever 9, causes the lever to turn around fulcrum 10 and move gate 4 out of the way from the maximum diametrical extent of the bottle.

Gate 4 is connected with a piston-cylinder arrangement 8 through lever 9 and has one end hingedly connected with the piston of the arrangement 8 and the other end of lever 9 is connected by means of fulcrum 10 with gate 4.

Figure 8:
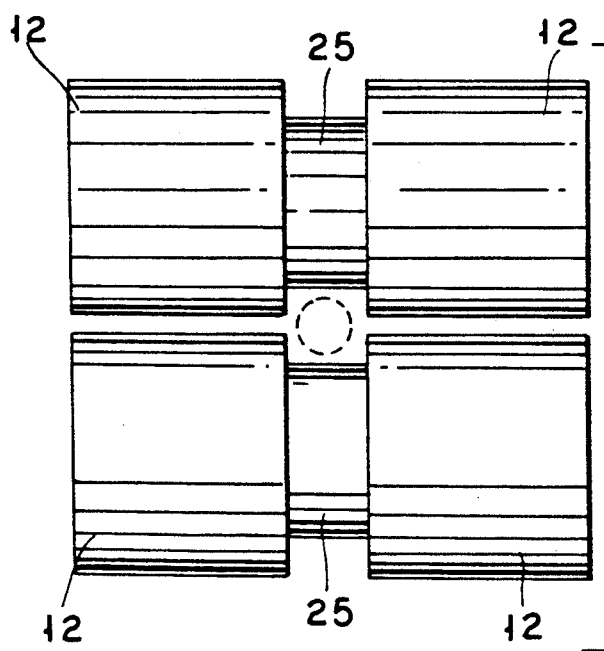
FIG. 8 is a schematic side view of the rollers of FIG. 4 with a central or interspace portion of reduced diameter and provided with an opening shown in dotted outline for receiving the neck of a bottle or container formed from plastic.

The next processing stage (FIG. 4) for the plastic container includes a funnel-shaped compressing sector 11 and roller pairs 12. Referring now more particularly to FIGS. 4 and 8, it will be noted that the accepted container then falls into funnel-shaped compressing sector 11 and the container is conveyed by gravity feed towards the two pairs of rollers 12 driven by associated motor variators or speed variation controls. These pairs of rollers turn in a counter-turning synchronism with each other, with one roller (the left one) turning in a clockwise direction and the other roller (the right one) turning in a counter-clockwise direction. Rollers 12 drag the container between the oppositely turning pairs of rollers for introduction therebetween and squeeze the plastic container for reduction in diametrical extent to produce a flattened form. A recovered squeezed form then comes out from between rollers 12 and falls into lower collector 13 (see FIG. 4) in the inside of the machine, and the flattened container then can be taken away by opening door 1a as provided for this purpose. Photocell totalizing counter 14 is provided to detect the passage of a processed container and charges or activates the electronic totalizing counter portion to provide a count of the number of plastic containers which have been processed.

Figure 5:
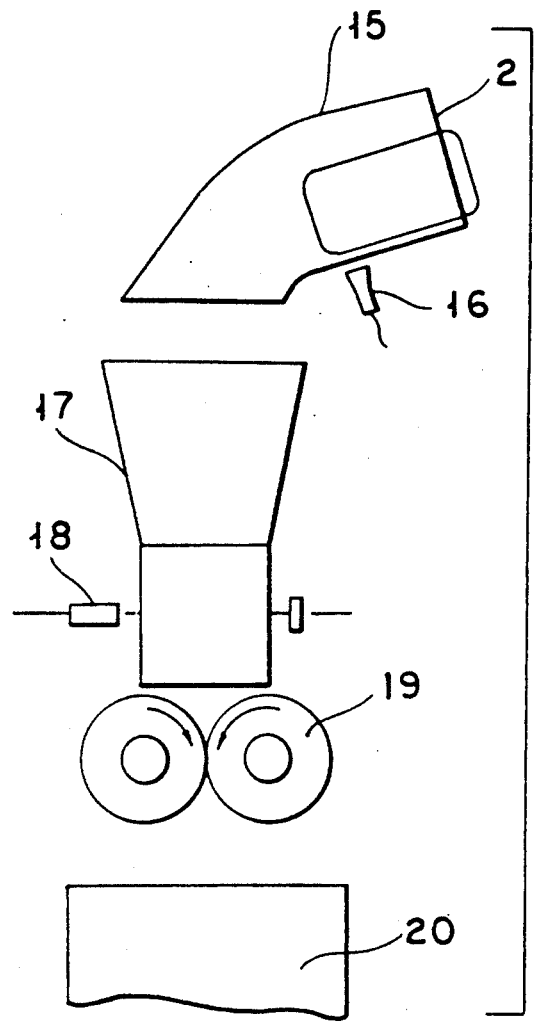
FIG. 5 is a partially schematic view of another portion of the unit intended primarily for use in connection with another operational cycle in connection with the processing of non-plastic containers with the portion for processing plastic containers as shown in FIGS. 2 to 4 being omitted for the sake of clarity; this portion being intended primarily and in particular for processing of metal containers.
Figure 7:
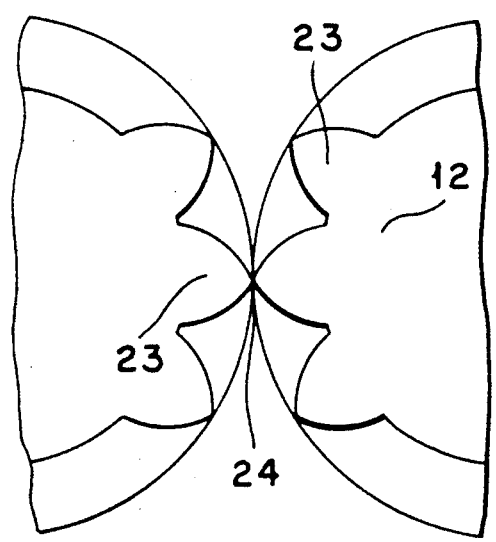
FIG. 7 is a schematic view of a detail of the squeezing rollers for use in particular in connection with metallic containers, and illustrating cutting teeth in a tip to tip or tangential contact with each other.

Referring now more particularly to FIGS. 5 and 7 which show the conveyor and processing portion for metal containers. For this purpose, cubicle C is provided with upper inlet or opening 2 through which the metal containers are introduced. Coupled with upper inlet 2 is a duct 15 provided with a sensor to sense the passage of metal containers M.

Sensor 16, in addition to having the capability of detecting whether the container is formed from metal or plastic, also has the capability of detecting solely those containers formed from aluminum and rejecting all others, such as iron. Operatively coupled with duct 15 is a funnel-shaped conveyor 17, a counting photocell 18 and, at the exit of conveyor 17, is a pair of spaced but circumferentially tangential rollers somewhat similar to rollers 12, one of which rotates in a clockwise direction, and the other of which rotates in a counter-clockwise direction for receiving therebetween a container M to be processed. After the container M is processed and squeezed into a substantially flat condition, it is placed into a container storage unit 20. It may also be desirable to distinguish among different types of aluminum containers and, for this purpose, counting photocell 18 can be of the type to read bar codes and be programmed to distinguish between aluminum containers from different source.

Figure 6:
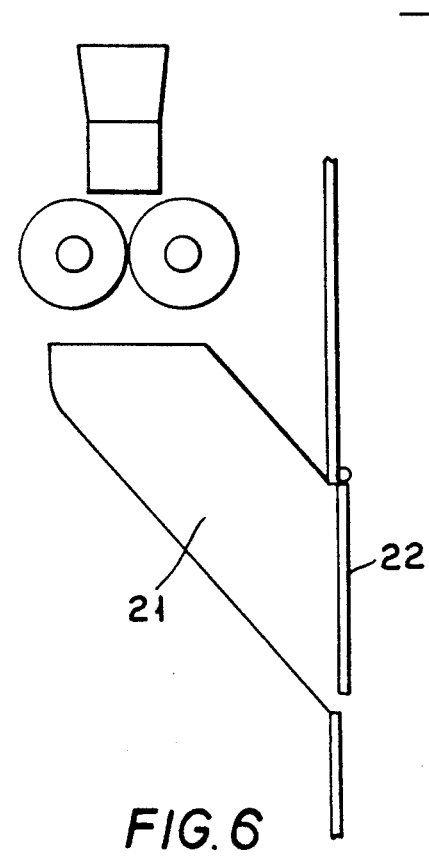
FIG. 6 is a modification of a portion of a discharging unit for the processing unit for receiving both plastic and metal containers illustrating an upper inlet, a funnel-shaped conveyor and squeezing rollers.

In some instances, it may not be desirable or advantageous to distinguish between different types of metal containers, as noted heretofore, such as between aluminum and non-aluminum materials. While it may be desirable to distinguish between plastic and metal containers for the purpose of returning of funds, it may be desirable to dispose of the processed containers without separation. For this purpose, funnel-shaped member 60, see FIG. 6, may be provided which is exemplary of funnel-shaped conveyor 11 or 17 for feeding to rollers 62 which is exemplary of roller 12 or 19 for discharge into conveying channel 21 coupled with a wall 64 to which door 22 is hinged at 66 to permit withdrawal of processed containers. After processing between rollers 12, 19, the processed plastic or metallic container is dropped into conveying channel 21 and can be transferred therefrom by gravity feed through door 22 to an outer collecting container (not shown).

For the metal containers, rollers 19 are formed differently, and, as best seen in FIG. 7, each roller 19 includes a portion which, if teeth 23 were not provided, would extend to arc portion 23a having an outer cylindrical surface in much the same manner as rollers 12 for the plastic containers which meet together and are tangential to each other at common tangential point 24 which defines cuts of each tooth. The peripheral teeth 23 of rollers 19 each have first and second accurate surfaces 35, 36 which meet together at apex 37, generally coinciding with tangential point 24, and have a spaced base portion 38 which lies on an arc of a circle 39 which is respectfully circumferentially parallel with the outer cylindrical surface portion of each of rollers 19 on which the tangential point 24 lies to provide for a cutting area between the adjacent teeth for cutting the metal containers to facilitate the following thereof.

Outer portion 23a is also coextensive with the outer peripheral surface of rollers 12 and, for certain purposes, both rollers 12 and 19 which are on the same axle can be used. Since both pairs of rollers 12 and 19 have their individual rollers on the same axle, they can be used at the same time to process both metal and plastic containers in the individual units.

The operational cycle of the metal containers M begins when they are introduced into opening 2. The container M sinks along duct 15 where it is preselected by special sensor 16 which points out whether the container is made from aluminum or from ferrous material. This provides for selectivity as to whether or not to pay a deposit for the returned container. If it is desired only to have the unit accept aluminum containers, and sensor 16 allows a container to pass because it is aluminum, then the container sinks along funnel-shaped conveyor 17, and passes counting photocell 18 and is squeezed by a pair of coaxial rollers 19 which can be provided to turn together with rollers 12.

A recovered squeezed form then falls into the underlying unit collector 13 or container 20.

Alternatively, recovered forms can be brought outside the machine by means of conveying channel 21 (FIG. 6) into an outer collecting container through door 22.

A particularly important detail of the squeezing system is that rollers 12, for recovering plastic containers, are fitted with their outer circumferentially diametrical extent tangentially to each other and the teeth 23 for metal containers, provided on the periphery of each wheel, are fitted in phase with each other and cuts 24 of each tooth meet on straight lines connecting the two rotation centers of the rollers.

The number of teeth is the same for each roller with the same diameter. It is possible to perform microcuts on containers made from plastic material which permits maintenance of the squeezed form and thus remains with a minimum encumbrance.

Referring now to FIG. 8 of the drawings which shows the central part between the two pairs of rollers 12 as including an additional pair of rollers 25 with a smaller diameter than rollers 12 in order to provide a space for introducing the container neck which was accepted at the beginning only in such position.

The use of the roller system 12 and 25 with different diameters permits a restriction of the roller diameter and, therefore, limits the encumbrance as well as the costs of the unit.

Figure 9:
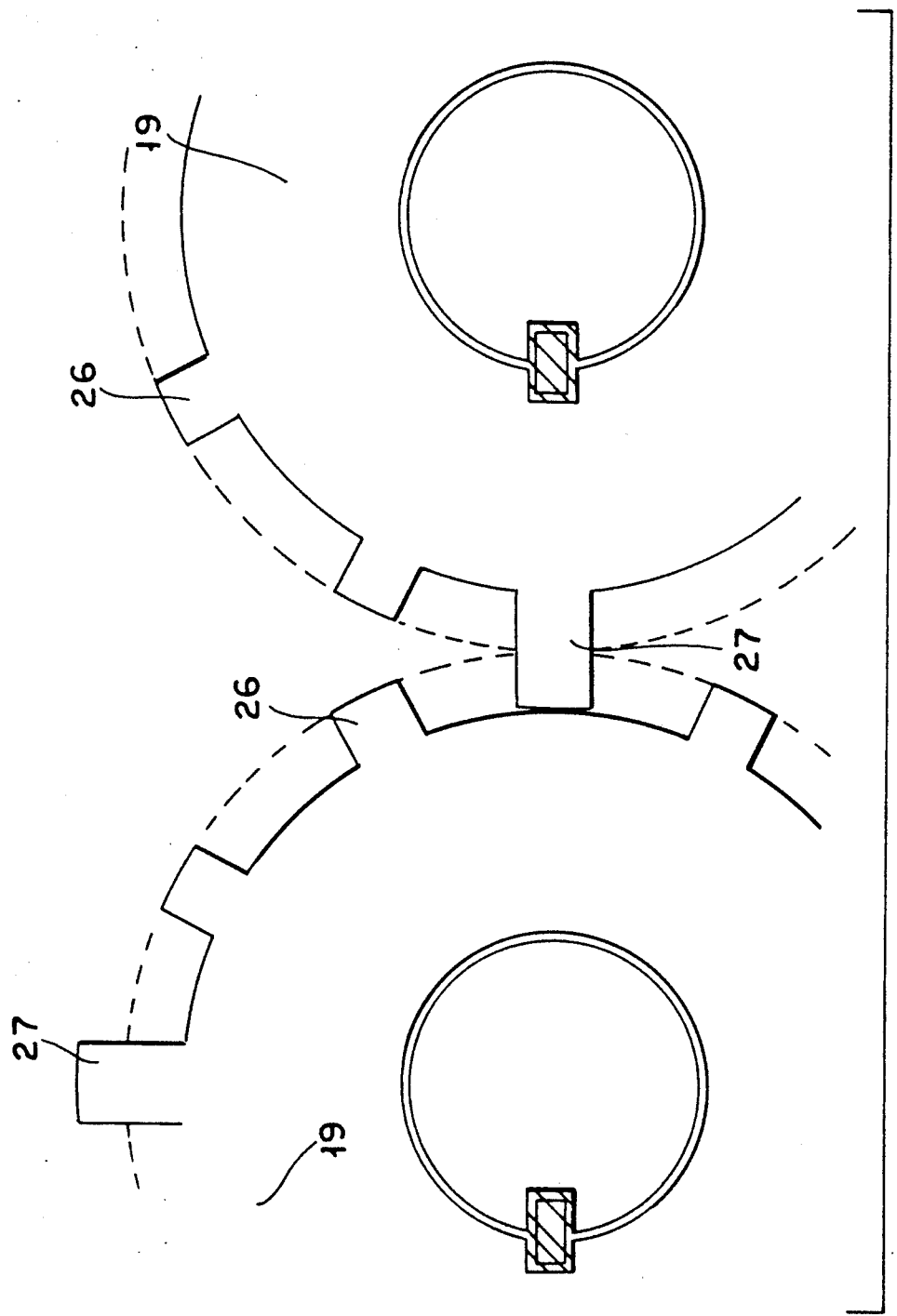
FIG. 9 is a schematic side view of a modification of the rollers shown in FIG. 7, showing squeezing rollers primarily intended for metal containers.
Figure 10:
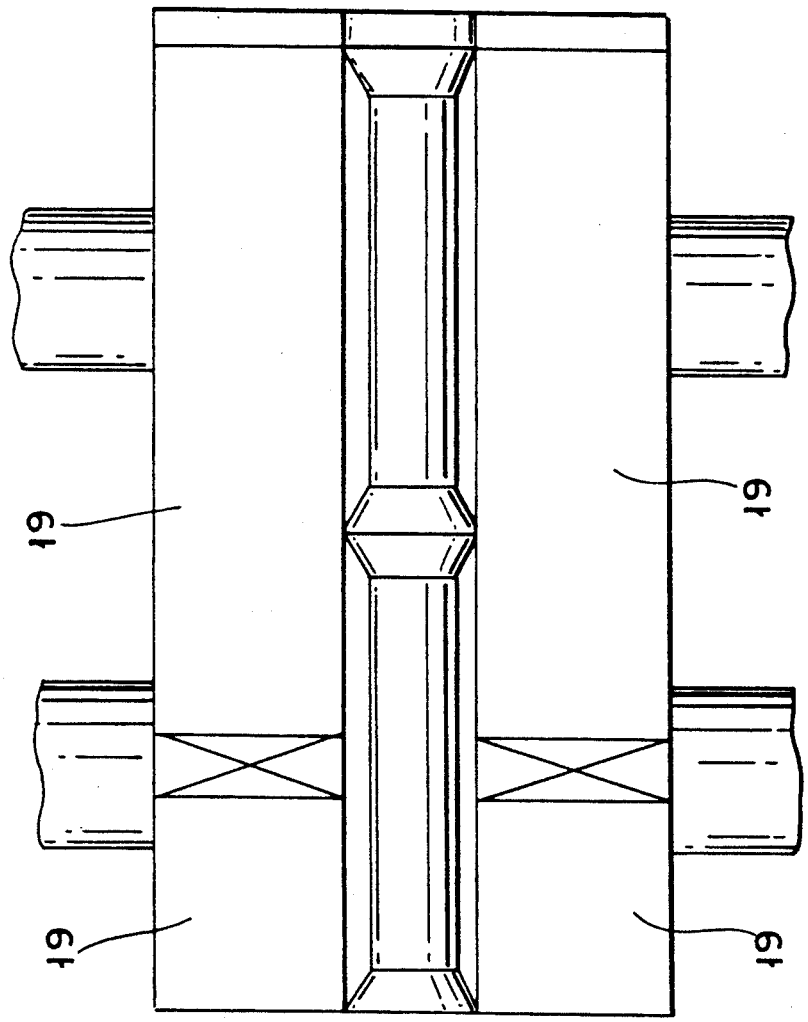
FIG. 10 is a schematic top view of a pair of roller couples.

Referring now more particularly to FIG. 9 which shows a modification of the peripheral teeth as shown in FIG. 7, each roller 19a is provided with one set of flat tangent teeth 26 having a width which is less than the spacing between adjacent teeth. In a preferred form of the invention, the spacing between teeth 26 is greater than twice the width of teeth 26. Positioned on the periphery of each of the rollers 19a is at least one tooth 27 having a width substantially equal to the width of teeth 26 and having a diametrical extent twice the diametrical extent of teeth 26 so that the tip of tooth 27 extends between teeth 26 to the base or root of tooth 26 when teeth 26 are in peripheral tangential contact with each other while rollers 19a rotate and the tooth 27 on each roller 19 extends between and into the interspace between adjacent flat tangent teeth 26. Each roller 19 is provided with at least one tooth 27 having an extent twice the extent of teeth 26 from their root to their outer tip. Each tooth 27 is positioned on roller 19 so that they do not coincide as rollers 19 rotate and either lie on the same diameter or extend in different diametrical extents as rollers 19 rotate.

Important in particular with respect to rollers 19a, which are used for recovering the metal material containers, is the fact that they are fitted with an outer indenture of flat tangent teeth 26 and flat copenetrating ones 27 that enables hooking of parts of the metal container when introduced and for ejection thereof on discharging.

Cubicle C can also be provided with a supply of full containers of the type of containers which are being recycled so that the machine can be programmed to supply either a ticket indicating the funds which are to be given for returned used containers or to provide merchandise in exchange for the returned used containers.

If the distributor is to be filled with containers which are to be supplied in exchange for delivered used ones, then this distributor can be connected to the unit in different ways. For this purpose, provision is made for two side cases 28 and 29 in which filled containers with a different or similar product are inserted. The delivery of these filled containers can take place automatically through doors 30 and 31, according to a program established in advance to provide a given type of filled containers in exchange for a given type of returned ones. This phase is integrated into the operation system completely automatically, and thus excludes the necessity of a staff intervention at the collection point. In particular, the computerization of a management program in the interrelation of the delivered empty containers in exchange for filled ones.

Also, it is possible to use a magnetic card to credit the number for which one is entitled to get a filled one. The reading system of a bar code on the containers, fitted at the inlet of the unit, enables one to identify the producer company, the material type and other information, thus collecting data which can be noted in the machine computer. By means of a portable instrument, the data can be retrieved and collected in a proper storage system and sent to a central computer.

It is possible to use a single ticket or magnetic card for both metal and plastic containers or a separate ticket or magnetic card for the plastic and metal containers.

It is within the scope of the invention to modify the unit by providing a third inlet similar to inlets 1 or 2 for glass bottles and containers and to distinguish such containers from plastic or metal.

While there has been disclosed what is considered to be the preferred embodiments of the present invention, various changes and modifications may be made without departing from the scope of the invention.

I claim:

1. A collection and recycling unit for used containers having two operating cycles formed from different materials, and comprising:

cubicle compartment means including individual means for carrying out two operating cycles and having first and second inlets, one for each said operating cycle, for receiving plastic and metal containers, respectively, said cubicle compartment means including means for withdrawal of processed plastic and metal containers;

first and second path means, one of said path means for each of said operating cycles, coupled with said first and second inlets, respectively, and with said withdrawal means for individually processing the plastic containers in one of said operating cycles and the metal containers in the other of said operating cycles and conveying thereof to said withdrawal means;

first and second container processing means each individually and separately responsive to the characteristics of the material of the container in said first and second path means, respectively, for processing the plastic containers in one of said processing means and the metal containers in the other of said processing means individually;

preselection means for necked containers having a reduced neck portion associated with said first path means including gate means for preselecting those containers having said reduced neck portion and allowing said reduced neck portion to pass through an opening in said gate means, sensing means for sensing the presence of a container having said neck portion after said reduced neck portion of said container passes through said opening, and gate opening means responsive to said sensing means to open said gate means and permitting said necked container to pass; and totalizing means responsive to each of said first and second container processing means for supplying an indicia of value related directly to the type of containers processed in said first and said second processing means.

2. The unit as claimed in claim 1, wherein said first and second container processing means each includes at least one pair of counter rotating roller means, and funnel means for directing the containers individually to said roller means by gravity feed, said roller means including rollers being juxtaposed to and adjacent to each other for processing a container therebetween.

3. The unit as claimed in claim 2, wherein said at least one pair of said counter rotating roller means includes first and second oppositely turning rollers, each of said rollers including outer peripheral teeth having an apex tip with said tips of said teeth being in tangential engagement with each other as said rollers rotate oppositely to each other.

4. The unit as claimed in claim 3, wherein said peripheral teeth each have first and second arcuate surfaces which meet together at said apex tip, and each have a spaced base portion which lies on an arc of a circle respectfully circumferentially parallel with an outer cylindrical surface of each of said rollers on which said apex tip lies.

5. The unit as claimed in claim 2, wherein each said roller of at least one of said roller means includes a first set of teeth having a flat top and the teeth of one of said adjacent rollers being in tangential engagement with the teeth of the other of said adjacent rollers, said teeth on each of said rollers having a width and a spacing between rollers greater than the width of said teeth, and each of said rollers having at least one tooth of width approximately equal to the width of the other of said teeth and having a diametrical extent from the root of the tooth twice the diametrical extent of said other of said teeth for being received within in two adjacent teeth of said adjacent roller and extending to the root between said two adjacent teeth of the other of said rollers, and both of said at least one tooth on said adjacent rollers lies on the same diameter or extends in different diametrical extents as said rollers rotate in said opposite directions.

6. The unit as claimed in claim 1, wherein said totalizing means includes means to select items of the type contained in the containers processed and supplying new items of the type contained in said containers to the value of the items returned and other indicia of the new items do not equal the value of the containers returned.

7. The unit as claimed in claim 1, wherein at least one of said first and second container processing means includes means detecting the characteristic of the material of the container for detecting solely aluminum containers and rejecting all others.

8. The unit as claimed in claim 2, including conveying channel means positioned beneath said at least one pair of roller means for receiving processed containers, and exit means coupled with said channel means for the withdrawal of processed containers, and means to read bar codes on said containers for supplying indicia of value commensurate in amounts with the containers returned.

9. A system for collecting and recycling used bottles, cans and similar items made from metal and plastic materials, having two different operative cycles, comprising:

a closed cubicle compartment provided with two openings, one of said openings being for introducing containers formed of plastic material and the other of said openings being for introducing metal material containers;

lower doors providing access to said cubicle, one for the plastic containers and the other for the metal containers, through which said containers of metal and plastic material can be separately removed;

one of said operative cycles for recycling of plastic containers being coupled with a separate one of said openings and being activated when a plastic container is introduced into said one opening;

gate means, and conveyor means for conveying the plastic container to said gate means, said gate means including a central opening for receiving the neck of the plastic container and allowing passage of the neck only;

sensor means associated with said gate means for sensing the neck of the container and the material thereof, said sensor means including a photocell and a reflector for operating an electrically operated piston-cylinder assembly coupled with said gate means for operation thereof, said piston-cylinder assembly being coupled by means of a lever to said gate means which turns on a fulcrum and opens said gate means, thus permitting the passage of the plastic container;

a pressure conveyor, the container falling into said pressure conveyor and being introduced by the neck to first roller means including intermediate couple of rollers positioned between two first squeezing roller;

said roller means including said squeezing roller couples and said intermediate rollers with differentiated diameters for reducing the size of the container to form a squeezing assembly in the form of a recovered body;

an outside collector, the recovered body then falls by gravity into said outside collector, said outside collector having a door and the body can be removed by opening said door;

the other of said operative cycles being activated by a metal container for recycling metal containers after having the metal container introduced through said second opening, said second opening including means for causing the metal container to pass through a conduit at which position it is sensed by a sensor means capable of recognizing the material type for authorizing payment;

means permitting the metal container to sink into a conveyor and pass before a photocell for counting the number, and second roller means for squeezing the metal containers after being counted, said second roller means including second squeezing rollers coaxial with said first squeezing rollers which turn simultaneously with said first squeezing rollers; and a channel and a door coupled therewith, through which said door a recovered body thus obtained is removed from said channel.

10. The system of claim 9, wherein:
said first squeezing rollers for recovering plastic containers operate with their outer diameters tangential to each other;
teeth provided on the periphery of each said first squeezing rollers and rotating in phase and edges of each said tooth meet on straight lines connecting the two turning centers of said first sqeezing rollers; and
the same number of teeth are on each said first squeezing rollers and are of the same diameter for producing microcuts on the material to maintain the recovery form.

11. The system of claim 9, wherein said first roller means forms a squeezing assembly for the plastic containers in axial position and comprises two pairs of squeezing rollers and a further interposed roller pair having a small diameter, and having an indented portion for centrally determining an introduction space for the container neck and for dragging thereof, to permit the use of said two pairs of squeezing rollers and the rollers provided with said smaller diameter and a reduction of the machine encumbrance.

12. The system of claim 9, wherein said second roller means forms a second squeezing assembly for metal material containers using said pairs of second rollers, said pairs of second roller pairs each having outer flat teeth which are partly tangent and copenetrating for enabling the holding of the introduced bodies and expelling them when discharging them.

13. The system of claim 9, wherein
said first and second roller means includes a squeezing roller assembly for plastic containers comprising three roller pairs (12) and (25) and one for metal containers comprising a pair of rollers (19) to form a single co-turning combined assembly of the operative cycles driven by only one moto-reducer system.

14. The system of claim 9, including a pair of compartments for holding a new supply of material contained in containers of the type of containers being processed for providing an incentive for the return of empty containers, each of said compartments being compact in different ways on the containment body of said unit, and distributor means for carrying out the automatic distribution of the containers through two doors, one for plastic containers, and one for metal containers.

15. The system of claim 9, including:
means to deliver an indication check showing the amount to pay back in addition to the number of the delivered containers or alternatively the number of filled containers a customer is entitled to receive;
bar code reader means for all the elements contained in the bar code, and means coupled with said bar code reader means for transferring information concerning packing typology and anything else that has been codified, said information being transferable to a data storage; and
means for crediting the number of the containers delivered back and, when a predetermined number has been reached, a filled container is delivered.

16. A collection and recycling unit for used containers having two operating cycles formed from different materials, and comprising:
cubicle compartment means including individual means for carrying out two operating cycles and having first and second inlets, one for each said operating cycle, for receiving plastic and metal containers, respectively, said cubicle compartment means including means for withdrawal of processed plastic and metal containers;
first and second path means, one of said path means for each of said operating cycles, coupled with said first and second inlets, respectively, and with said withdrawal means for individually processing the plastic containers in one of said operating cycles and the metal containers in the other of said operating cycles and conveying thereof to said withdrawal means;
first and second container processing means each individually and separately responsive to the characteristics of the material of the container in said first and second path means, respectively, for processing the plastic containers in one of said processing means and the metal containers in the other of said processing means individually, said first and second container processing means including at least two pairs of counter-rotating rollers positioned on a pair of spaced axles for maintaining a portion of each pair of adjacent rollers in tangential contact as said rollers rotate, one of said pairs of adjacent rollers having a first outer configuration suitable for processing plastic containers, and another of said pairs of adjacent rollers having a second outer configuration suitable for processing metal containers, and
totalizing means responsive to each of said first and second container processing means for supplying an indicia of value related directly to the type of containers processed in said first and said second processing means.

17. The unit as claimed in claim 16, wherein said first and second container processing means includes funnel means for directing the containers individually to said rollers by gravity feed, said rollers being juxtaposed to and adjacent to each other for processing a container therebetween.

18. The unit as claimed in claim 16, wherein each said roller of at least one of said roller means includes a first set of teeth having a flat top and the teeth of one of said adjacent rollers being in tangential engagement with the teeth of the other of said adjacent rollers, said teeth on each of said rollers having a width and a spacing between rollers greater than the width of said teeth, and each of said rollers having at least one tooth of width approximately equal to the width of the other of said teeth and having a diametrical extent from the root of the tooth twice the diametrical extent of said other of said teeth for being received within in two adjacent teeth of said adjacent roller, and both of said at least one tooth on said adjacent rollers lies on the same diameter or extends in different diametrical extents as said rollers rotate in said opposite directions.

19. The unit as claimed in claim 16, wherein at least one pair of said counter rotating rollers includes outer peripheral teeth having an apex tip with said tips of said teeth being in tangential engagement with each other as said rollers rotate oppositely to each other, said peripheral teeth each have first and second arcuate surfaces which meet together at said apex tip, and each have a spaced base portion which lies on an arc of a circle respectfully circumferentially parallel with an outer cylindrical surface of each of said rollers on which said apex tip lies.

20. The unit as claimed in claim 16, wherein said first path means includes neck means for preselecting those containers having a reduced portion forming a neck, sensing means for sensing the presence of a necked container having a neck, gate means responsive to said sensing means for sensing the presence of a neck container adjacent to and oriented with the neck thereof adjacent to said gate means and having said neck extending through an opening in said gate means, and means to remove a portion of said gate means preventing said necked container from moving along said first path means and permitting said container to pass along said first path means.

* * * * *